United States Patent
Ku et al.

(10) Patent No.: US 8,302,125 B2
(45) Date of Patent: Oct. 30, 2012

(54) APPARATUS AND METHOD FOR PROVIDING EPG, AND TERMINAL AND METHOD FOR DISPLAYING EPG

(75) Inventors: Tai Yeon Ku, Busan (KR); Dong Hwan Park, Daejeon (KR); Kyeong Deok Moon, Daejeon (KR)

(73) Assignees: Electronics and Telecommunications Research Institute (KR); Samsung Electronics Co., Ltd. (KR)

( * ) Notice: Subject to any disclaimer, the term of this patent is extended or adjusted under 35 U.S.C. 154(b) by 1020 days.

(21) Appl. No.: 11/124,460

(22) Filed: May 6, 2005

(65) Prior Publication Data

US 2005/0289596 A1 Dec. 29, 2005

(30) Foreign Application Priority Data

Jun. 12, 2004 (KR) .................. 10-2004-0043327

(51) Int. Cl.
*H04N 5/455* (2006.01)
(52) U.S. Cl. ................ 725/45; 725/53; 725/56
(58) Field of Classification Search .............. 725/45, 725/53, 56
See application file for complete search history.

(56) References Cited

U.S. PATENT DOCUMENTS

| | | | | |
|---|---|---|---|---|
| 5,517,254 | A * | 5/1996 | Monta et al. ............. | 348/569 |
| 6,414,720 | B1 * | 7/2002 | Tsukidate et al. ......... | 348/469 |
| 6,438,752 | B1 * | 8/2002 | McClard ................ | 725/46 |
| 6,452,644 | B1 * | 9/2002 | Shimakawa et al. ....... | 348/730 |
| 6,774,926 | B1 * | 8/2004 | Ellis et al. ............. | 348/14.01 |
| 7,013,290 | B2 * | 3/2006 | Ananian ................ | 705/27 |
| 2002/0059596 | A1 * | 5/2002 | Sano et al. ............. | 725/39 |
| 2003/0033607 | A1 * | 2/2003 | Schwalb ............... | 725/112 |
| 2004/0197082 | A1 * | 10/2004 | Yim .................... | 386/83 |
| 2004/0216168 | A1 * | 10/2004 | Trovato et al. .......... | 725/135 |
| 2005/0028208 | A1 * | 2/2005 | Ellis et al. ............. | 725/58 |
| 2006/0029368 | A1 * | 2/2006 | Harville ............... | 386/69 |

FOREIGN PATENT DOCUMENTS

| | | |
|---|---|---|
| JP | 2001-045460 | 2/2001 |
| JP | 2002-252789 | 9/2002 |
| KR | 1020010029050 A | 4/2001 |
| KR | 1020020061126 A | 7/2002 |
| KR | 1020040010963 A | 2/2004 |

OTHER PUBLICATIONS

"Electronic Program Guide based on User Preference for Mobile Device", T. Ku, et al., Proceedings of the 21st KIPS Spring Conference, vol. 11, No. 1, 9 pages.

* cited by examiner

*Primary Examiner* — Pankaj Kumar
*Assistant Examiner* — Franklin Andramuno
(74) *Attorney, Agent, or Firm* — Blakely, Sokoloff, Taylor & Zafman

(57) ABSTRACT

Provided are an apparatus and method for providing en electronic program guide (EPG) and a terminal and method for displaying the EPG. The apparatus includes an information extracting unit extracting the information about the electronic program guide, which specifies broadcasts according to time and channel, from a broadcast signal, a document creating unit converting the extracted information about the electronic program guide into a document in a data format permitted in a user's terminal, and a command processor processing a service command regarding a broadcast selected based on the converted document. Accordingly, it is possible to make an EPG based on a user's favorite broadcasts and provide the EPG to the user's terminal.

20 Claims, 6 Drawing Sheets

APPARATUS AND METHOD FOR PROVIDING EPG, AND TERMINAL AND METHOD FOR DISPLAYING EPG

CROSS-REFERENCE TO RELATED PATENT APPLICATIONS

This application claims the priority of Korean Patent Application No. 10-2004-0043327, filed on Jun. 12, 2004, in the Korean Intellectual Property Office, the disclosure of which is incorporated herein in its entirety by reference.

BACKGROUND OF THE INVENTION

1. Field of the Invention

The present invention relates to an electronic program guide (EPG), and more particularly, to an apparatus and method for providing an EPG to a user terminal, and a terminal and method for displaying the EPG.

2. Description of the Related Art

An electronic program guide (EPG) is one of services helpful to a digital broadcast user. The EPG is provided according to the MPEG-2 standard using a digital broadcast transmission format. The EPG is transmitted to a private section, as defined in each transmission medium.

Each set top box is capable of making a schedule of programs to be broadcast for a predetermined period from now, using the EPG. For instance, the set top box creates a schedule of programs to be broadcast for seven days from now via all channels or a channel through which a user is now viewing a program.

Using the EPG, the set top box provides a function of reserving a program to be viewed, and a Digital Video Recorder (DVR) provides a function of reserving a program to be recorded.

When receiving a request for the EPG from a viewer during broadcasting of a TV program, a conventional EPG providing apparatus stops displaying the TV program which is currently being broadcast. The conventional EPG providing apparatus displays the EPG in a full screen mode.

When receiving a request for the EPG from a viewer during broadcasting of a TV program, another conventional EPG providing apparatus displays the TV program, which is currently being broadcast in a full screen mode, on a part of a screen, and yet another conventional apparatus displays the EPG on a part of the screen.

Accordingly, the other viewers who are also watching the TV program would feel inconvenience. Also, displaying of both a broadcast and the EPG on a screen would cause a picture of the broadcast to be distorted.

To solve these problems, Korean patent laid-open publication No. 2001-0029050 discloses a method of exchanging data between a personal digital assistant (PDA) and a digital television (TV), using Jini which is a Java application program. In particular, this method allows a user to view digital information provided by the digital TV, using the PDA. However, this method is disadvantageous in that a Java virtual machine must be installed into both the digital TV and the PDA, and a terminal capable of exchanging data with the digital TV is limited to the PDA.

In the meantime, a conventional EPG providing apparatus is limited to providing service information that a broadcasting station inserts into a broadcast to be transmitted. Korean patent laid-open publication No. 2002-0061126 discloses a technique of allowing favorite channels, which are frequently selected in a digital broadcast receiver, to be automatically selected, categorized, and displayed in an EPG. Here, the digital broadcast receiver may be a digital TV capable of receiving digital data via a multi-channel.

However, the favorite channels are channels that are frequently viewed by a plurality of users, not a user, and the range of user preference is broad since it is determined by detecting favorite channels, not favorite programs. Thus, the EPG does not appropriately show user preference.

Also, this technique simply displays the favorite channels to be differentiated from the other channels, and does not permit the EPG to be remade according to the favorite channels.

Korean patent laid-open publication No. 2004-0010963 suggests changing a current channel to a channel which broadcasts a favorite program. In this method, a broadcasting station determines the category of each program, inserts information regarding the determined category into the corresponding program, and transmits the program to a receiver. The receiver extracts the category information from the received program, and compares the extracted category information with category information of a favorite program which has been determined by a user. When the comparison reveals that the extracted category information is the same as the predetermined category information, a current channel is automatically changed to a channel which broadcasts a favorite program after the user completes viewing a current broadcast.

However, this method is based on user preference which has been predetermined by a user, not being obtained by substantially selecting a broadcast. Also, unless a user does not disable a function of automatically changing favorite broadcasts, the favorite broadcasts are automatically changed even when the user does not desire to change the favorite broadcasts. In this case, when the number of users is more than one, whether the function is to be disabled must be determined every time when users are changed.

SUMMARY OF THE INVENTION

The present invention provides an EPG providing apparatus and method for providing an electronic program guide (EPG) after converting the EPG in a data format permitted in a user terminal.

The present invention also provides an apparatus and method for providing an EPG which is created based on an individual user's preference to broadcasts.

The present invention also provides a terminal and method for displaying information regarding broadcasts, which are categorized according to time and channels, and a menu of service commands for the broadcasts.

According to one aspect of the present invention, there is provided an apparatus for providing an electronic program guide, the method comprising an information extracting unit extracting the information about the electronic program guide, which specifies broadcasts according to time and channel, from a broadcast signal; a document creating unit converting the extracted information about the electronic program guide into a document in a data format permitted in a user's terminal; and a command processor processing a service command regarding a broadcast selected based on the converted document.

According to another aspect of the present invention, there is provided an apparatus for providing an electronic program guide, the apparatus comprising an information extracting unit extracting the electronic program guide, which specifies broadcasts according to time and channel, from a broadcast signal; a favorite broadcast detecting unit detecting the user's favorite channels according to time, based on information regarding broadcasts selected by the user; and a document creating unit converting information regarding broadcasts, which are broadcast via the user's favorite channels, into a document in a data format permitted in the user's terminal, the information included in the extracted the electronic program guide.

According to yet another aspect of the present invention, there is provided a method of providing an electronic program guide, the method comprising extracting the electronic program guide, which specifies broadcasts according to time and channel, from a broadcast signal; converting the extracted electronic program guide into a document in a data format permitted in a user's terminal; and processing a service command regarding a broadcast selected based on the converted document.

According to still another aspect of the present invention, there is provided a method of providing an electronic program guide, the method comprising extracting the electronic program guide, which specifies broadcasts according to time and channel, from a broadcast signal; detecting a user's favorite channels according to time, based on information regarding broadcasts selected by the user; and converting information regarding broadcasts, which are broadcast via the user's favorite channels, into a document in a data format permitted in the user's terminal, the information included in the extracted electronic program guide.

According to still another aspect of the present invention, there is provided a terminal comprising a receiving unit receiving an electronic program guide and an electronic program guide application from an apparatus which provides an electronic program guide; a display unit displaying broadcasts, which are specified in the electronic program guide, according to time and channel, and a menu of service commands regarding the displayed broadcasts, using the electronic program guide application; an input unit receiving information regarding selection of the displayed broadcasts and information regarding selection of the displayed service commands; and a transmitting unit transmitting the received information to the apparatus.

According to still another aspect of the present invention, there is provided a method of displaying an electronic program guide, the method comprising receiving the electronic program guide and an electronic program guide application from an apparatus which provides an electronic program guide; displaying broadcasts, which are listed in the electronic program guide, according to time and channel, and a menu of service commands regarding the displayed broadcasts, using the electronic program guide application; receiving information regarding selection of the displayed broadcasts and information regarding selection of the displayed service commands; and transmitting the received information to the apparatus.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference the accompanying drawings.

Figure 1A:
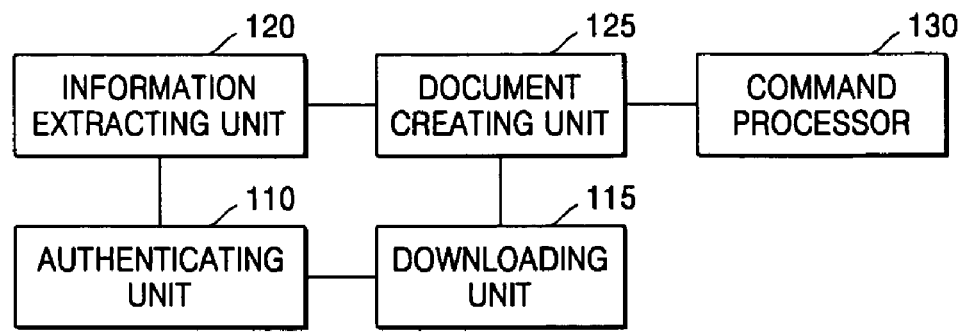
FIG. 1A is a block diagram of an apparatus for providing an electronic program guide (EPG) according to an embodiment of the present invention.

FIG. 1A is a block diagram of an apparatus which provides an electronic program guide (EPG) according to an embodiment of the present invention. The apparatus includes an authenticating unit 110, a downloading unit 115, an information extracting unit 120, a document creating unit 125, and a command processor 130.

The authenticating unit 110 authenticates a user by checking user identification and password received from a terminal of the user. The terminal may be a mobile phone, a personal digital assistant (PDA), a web pad, and a remote controller.

If an EPG application is not downloaded to the terminal, the downloading unit 115 downloads the EPG application to the terminal.

If the EPG application is downloaded to the terminal, the downloading unit 115 compares the version of the existing EPG application downloaded to the terminal with the version of an available EPG application which can be downloaded to the terminal. If the version of the existing EPG application is lower than that of the available EPG application, the downloading unit 115 downloads the available EPG application to the terminal.

The downloading unit 115 stores information regarding a terminal to which an EPG application is downloaded, and the version of the downloaded EPG application. The downloading unit 115 determines whether there is an EPG application downloaded to the terminal and whether the downloaded EPG application is the latest version, according to the stored information.

The terminal displays an EPG provided from the apparatus, using the downloaded EPG application. With the EPG application, it is possible to display broadcasts according to time and channel, and display detailed information regarding each broadcast. The detailed information regarding a broadcast is obtained from broadcast service information which a broadcasting inserts into the broadcast.

The EPG application generates predetermined service commands. The service commands may be a command of changing a current channel, a command of reserving a broadcast to be watched, a command of recording a broadcast, a command of reserving a broadcast to be recorded, and a command of setting an alarm for broadcast time. Here, the commands are related to broadcasts listed in the EPG.

The user may input the command of changing a current channel by clicking a channel change icon displayed specially on a screen of the terminal according to the EPG application, or clicking a desired broadcast on the screen.

The downloading unit 115 stores EPG applications, each based on a communication protocol of each of various types of terminals. The downloading unit 115 downloads an EPG application, which is based on a communication protocol of the terminal, to the terminal which requests the EPG.

The downloading unit 115 may divide terminals into a luxury terminal and a light terminal according to a communication protocol adopted. The downloading unit 115 stores an EPG application based on a communication protocol of the luxury terminal and an EPG application based on a communication protocol of the light terminal. The downloading unit 115 downloads an EPG application for the luxury terminal when a terminal requesting the EPG is the luxury terminal, and downloads an EPG application for the light terminal when the terminal is the light terminal.

A broadcasting station inserts broadcast service information into a broadcast signal to be transmitted. The information extracting unit 120 extracts the broadcast service information from the broadcast signal, and obtains the EPG by parsing the extracted broadcast service information in real time. The EPG includes information regarding broadcasts according to time and channel.

The document creating unit 125 converts the EPG extracted by the information extracting unit 120 into a document in a data format permitted in the terminal of the user. For instance, the document creating unit 125 converts the extracted EPG into a web document or a HTML document. Next, the document creating unit 125 transmits the document to the terminal.

The user inputs a predetermined service command to the apparatus, using the terminal receiving the document. The command processor 130 receives the input service command. The service command may be a command of changing a current channel, a command of reserving a broadcast to be watched, a command of recording a broadcast, a command of reserving a broadcast to be recorded, and a command of setting an alarm for broadcast time. The service command is input to the apparatus, using an EPG application installed in the terminal.

The command processor 130 processes the received service command. The command processor 130 may perform the service command by mapping it to an element (not shown) which will substantially perform the service command. The command processor 130 transmits a command to broadcast middleware, that is, the command processor 130 is subject to an infrastructure of the broadcast middleware.

When the user inputs the command of changing a current channel to a channel through which a broadcast displayed on the terminal is broadcast, the command processor 130 maps the command to a unit which is installed outside the apparatus so as to perform channel change.

When the user inputs the command of reserving a broadcast, which is displayed on the terminal, to be recorded or watched, the command processor 130 maps the command to a unit which is installed outside the apparatus so as to perform the command.

When the user inputs the command of setting an alarm for the broadcast time of a broadcast displayed on the terminal, the command processor 130 displays on the terminal that the broadcast is being broadcast or time when the broadcast will be broadcast. The command processor 130 maps the command to a unit which is installed outside the apparatus so as to perform the command.

The command processor 130 allows the document creating unit 125 to convert information regarding the alarm into a document in a data format permitted in the terminal. Then, the command processor 130 transmits the document to the terminal, and the terminal displays the information regarding the alarm described in the document using the EPG application.

Figure 1B:
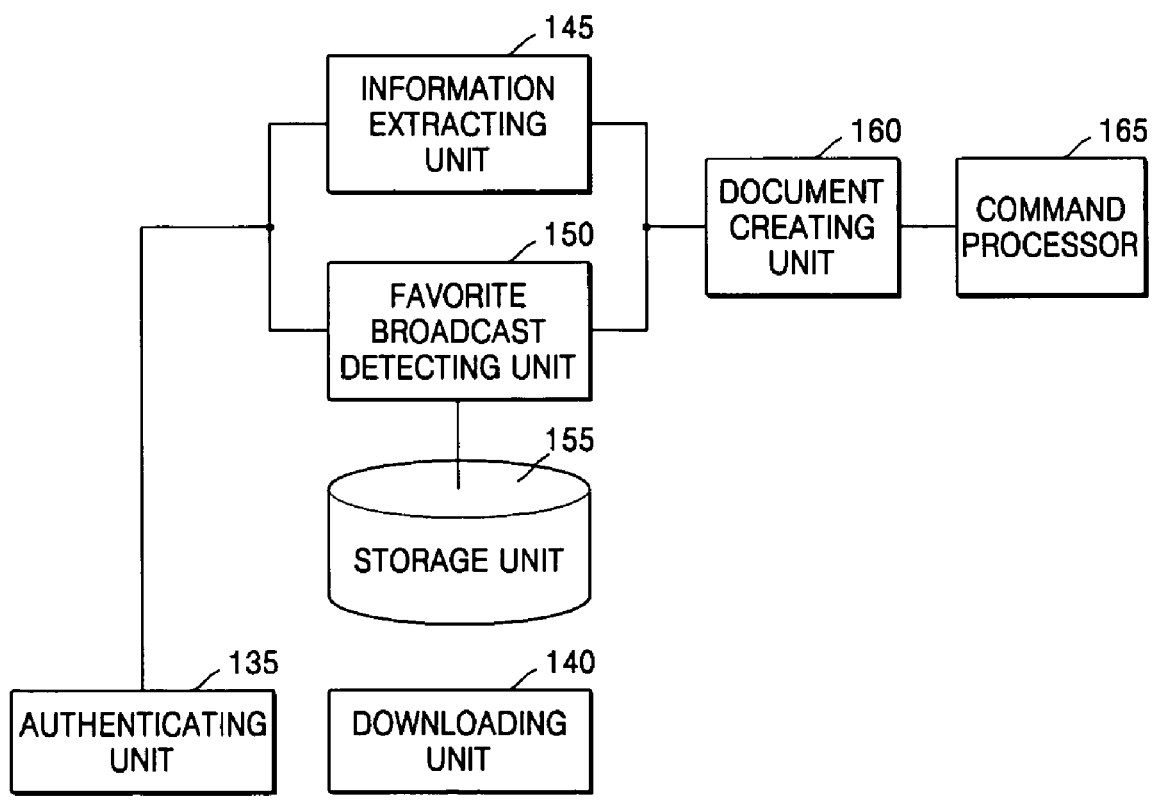
FIG. 1B is a block diagram of an apparatus for providing an EPG according to another embodiment of the present invention.

FIG. 1B is a block diagram of an apparatus for providing an EPG according to another embodiment of the present invention. The apparatus includes an authenticating unit 135, a downloading unit 140, an extracting unit 145, a favorite broadcast detecting unit 150, a storage unit 155, a document creating unit 160, and a command processor 165.

The authenticating unit 135, the downloading unit 140, and the information extracting unit 145 are similar to the authenticating unit 110, the downloading unit 115, and the information extracting unit 120 illustrated in FIG. 1A, respectively.

The favorite broadcast detecting unit 150 determines a user's favorite channels according to time, based on broadcast selection information of the user.

Specifically, the favorite broadcast detecting unit 150 may determine the user's favorite channels according to time by computing statistics of channels selected by the user according to time using the broadcast selection information.

The broadcast selection information is obtained using broadcast selection information received from the terminal and broadcast selection information received from a set top box system.

The favorite broadcast detecting unit 150 detects broadcasts, which are to be broadcast via the user's favorite channels according to time, from broadcasts to be given from now on.

The user's favorite channels according to time are favorite channels of a single user. When a plurality of authenticated users request the EPG, favorite broadcasts of each of the users are detected.

The storage unit 155 classifies and stores the broadcast selection information according to user and time. The favorite broadcast detecting unit 150 detects favorite channels of the user who requests the EPG according to time, based on the information stored in the storage unit 155. The favorite broadcast detecting unit 150 transmits information regarding the detected favorite channels to the document creating unit 160.

The document creating unit 160 receives information regarding the broadcasts, which are to be given via the user's favorite channels detected by the favorite broadcast detecting unit 150, among the broadcasts listed in the EPG output from the information extracting unit 145; and converts the received information into a document in a data format permitted in the terminal.

The document creating unit 160 may make a list of recommended broadcasts according to time, using the user's favorite broadcasts, and convert the list into a document in a data format permitted in the terminal.

The document creating unit 160 may also convert information regarding an alarm for the broadcast times of the broadcasts, which are to be given via the favorite channels detected by the favorite broadcast detecting unit 150, into a document in a data format permitted in the terminal.

The document creating unit 160 transmits the document to the terminal.

When the user inputs, via a terminal, a command of changing a current channel to one of the user's favorite channels according to time, the command processor 180 receives and allows the command to be performed.

When the user inputs, via the terminal, a command of reserving a broadcast, which is to be given via one of the user's favorite channels according to time, to be watched or a command of reserving the broadcast to be recorded, the command processor 180 receives the command and allows the command to be performed.

Figure 2A:
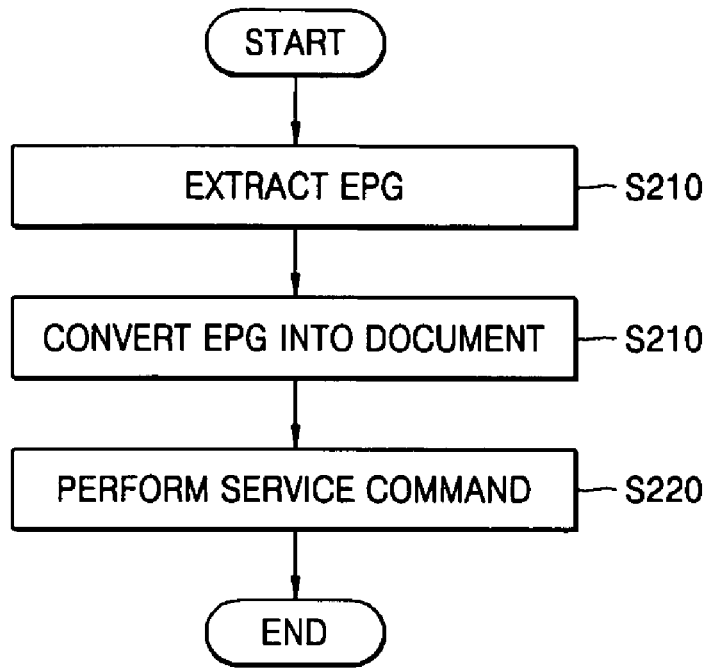
FIG. 2A is a flowchart of a method of providing an EPG according to an embodiment of the present invention.

FIG. 2A is a flowchart of a method of providing an EPG according to an embodiment of the present invention. Referring to FIGS. 1A and 2A, the information extracting unit 120 extracts broadcast service information from a broadcast signal, and obtains the EPG by parsing the extracted broadcast service information (S210).

Next, the document creating unit 125 converts the obtained EPG into a document in a data format permitted in a predetermined terminal (S215). The document creating unit 125 sends the document to the terminal.

The terminal displays the document using an EPG application installed into the terminal. The user inputs a predetermined service command related to a broadcast specified in the displayed document. The service command is also input to the command processor 130. The command processor 130 maps the command to an element which will substantially perform the command so that the command can be performed (S220).

Figure 2B:
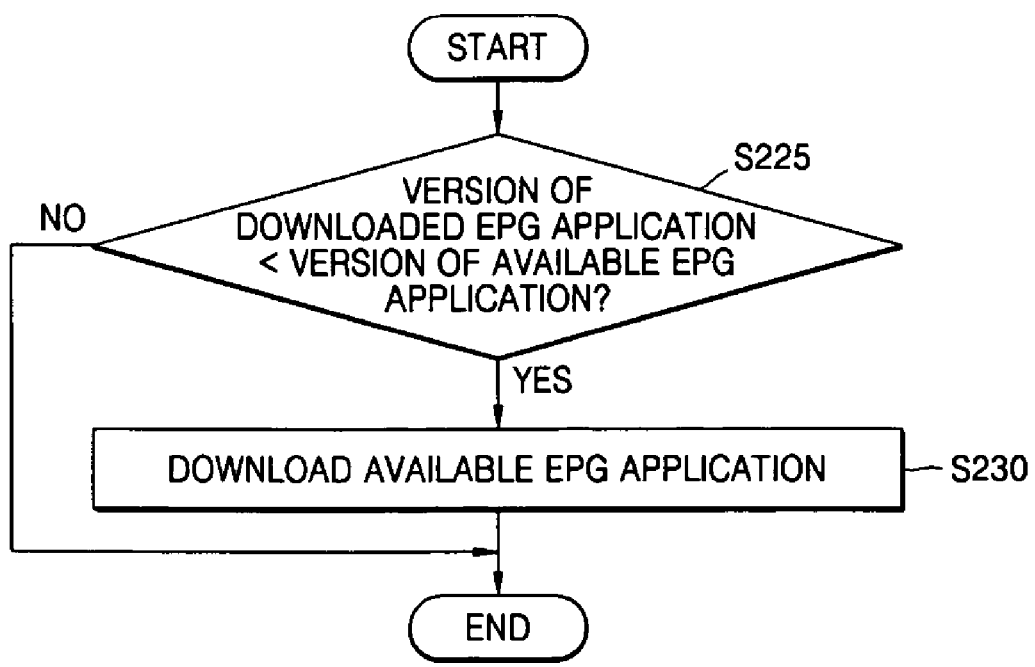
FIG. 2B is a flowchart of a method of downloading an EPG application to be used in the method of FIG. 2A, according to an embodiment of the present invention.

FIG. 2B is a flowchart of a method of downloading an EPG application to be used in the method of FIG. 2A, according to an embodiment of the present invention. Referring to FIGS. 1A and 2B, the downloading unit 115 compares the version of an EPG application downloaded to a terminal with that of an available EPG application that can be downloaded to the terminal (S225).

When the version of the downloaded EPG application is lower than that of the available EPG application, the downloading unit 115 downloads the available EPG application to the terminal (S230).

When a user inputs a command of requesting an EPG to the terminal, the EPG application is downloaded, in parallel with operation S 210 of FIG. 2A in which the EPG is obtained. That is, the EPG application may be downloaded regardless of when operation S210 is performed.

Figure 2C:
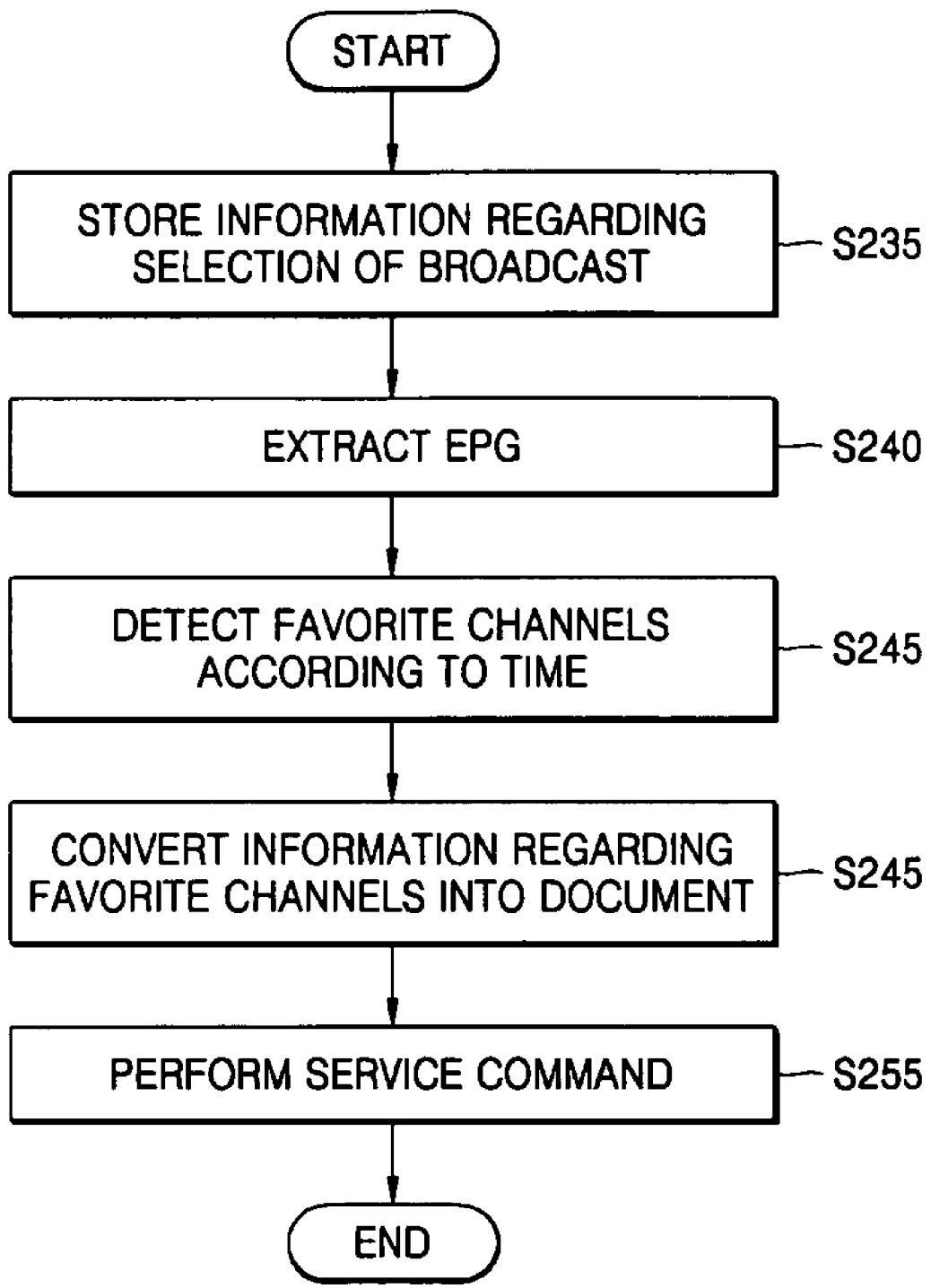
FIG. 2C is a flowchart of a method of providing an EPG according to another embodiment of the present invention.

FIG. 2C is a flowchart of a method of providing an EPG according to another embodiment of the present invention. Referring to FIGS. 1B and 2C, the storage unit 155 classifies and stores broadcast selection information according to user, time, and channel (S235). Next, the EPG is obtained as similarly in operation S210 of FIG. 2A (S240).

Next, the favorite broadcast detecting unit 150 determines a user's favorite channels according to time, based on broadcast selection information of a user (S245). In operation S245, the broadcast selection information stored in operation S235 is used to determine the user's favorite channels.

Operation S240 may be performed in parallel with operation S245. That is, operation S240 may be performed regardless of when operation S245 is performed.

Next, the document creating unit 160 converts information regarding broadcasts, which are broadcast via the user's favorite channels, among broadcasts listed in the obtained EPG into a document in a data format permitted in the user's terminal, and sends the document to the user's terminal (S250).

Operations S240 and s245 of FIG. 2C may be performed in parallel with the method of downloading an EPG application, illustrated in FIG. 2B. In other words, operations S240 and S245 may be performed regardless of when the EPG application is downloaded.

Operation S255 is similar to operation S220 of FIG. 2A except that the service command is related to a broadcast to be broadcast via one of the user's favorite channels according to time, the service command being input to the user's terminal by the user.

Figure 3A:
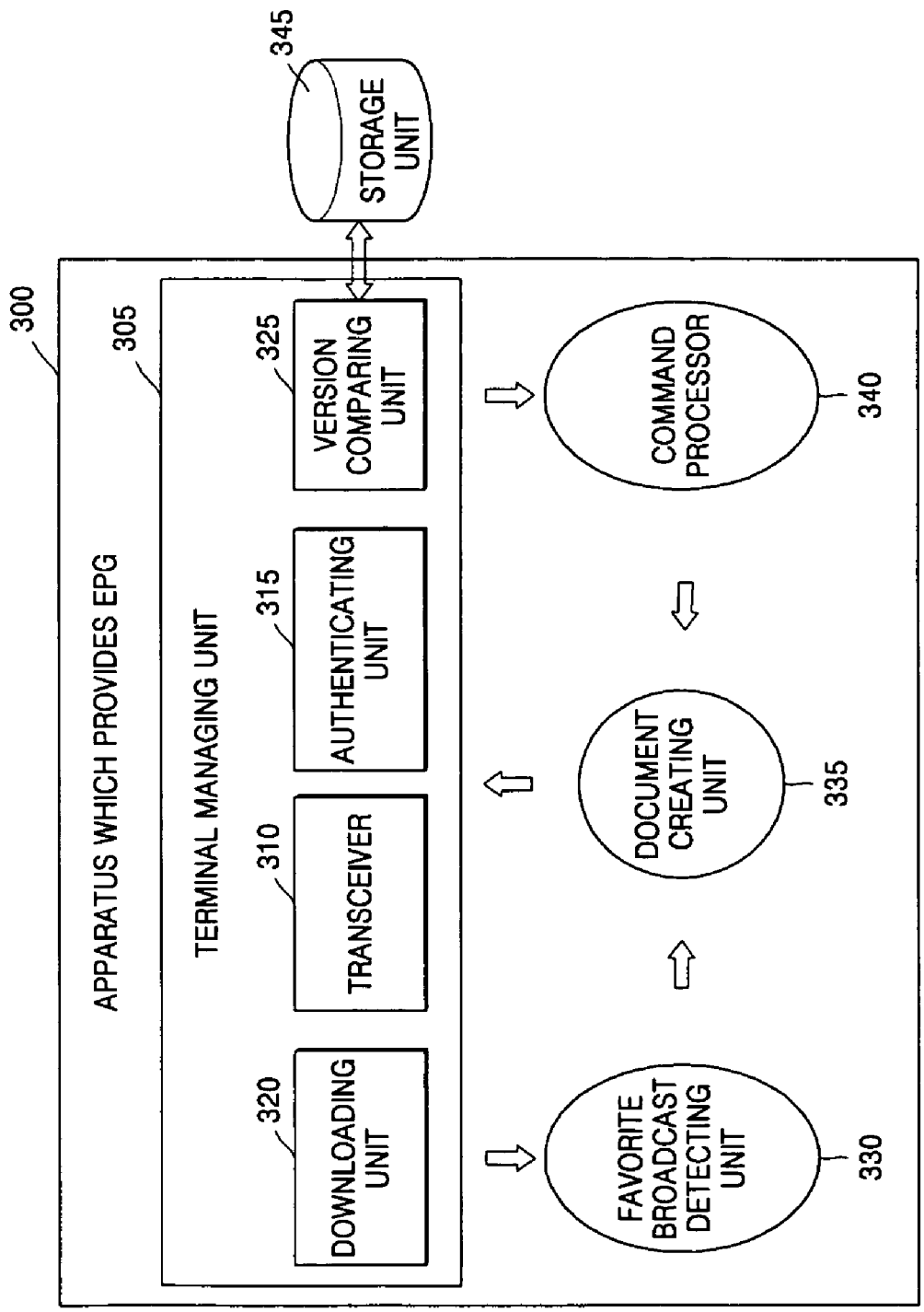
FIG. 3A is a block diagram of an apparatus for providing an EPG according to yet another embodiment of the present invention.

FIG. 3A is a block diagram of an apparatus 300 which provides an EPG according to yet another embodiment of the present invention. The apparatus 300 includes a terminal managing unit 305, a favorite broadcast detecting unit 330, a document creating unit 335, a command processor 340, and a storage unit 345.

The favorite broadcast detecting unit 330, the storage unit 345, the document creating unit 335, and the command processor 340 are similar to the favorite broadcast detecting unit 150, the storage unit 155, the document creating unit 160, and the command processor 165 of FIG. 1B, respectively.

The terminal managing unit 305 controls interactions between the apparatus 300 and a terminal, and acts as a server which manages a plurality of users. The terminal managing unit 305 includes a downloading unit 330, a transceiver 310, an authenticating unit 315, and a version comparing unit 325.

The authenticating unit 315 and the downloading unit 320 are similar to the authenticating unit 135 and the downloading unit 140 of FIG. 1B, respectively.

The transceiver 310 acts a medium for exchange of information between another module of the apparatus 300 [or a set top box system (not shown)] and the terminal. The transceiver 310 also transmits, to the command processor 340, a command of changing a current channel, a command of setting an alarm, a command of recording a broadcast, a command of reserving a broadcast to be watched, and a command of scheduling a channel which are input via the terminal.

Information received from another module of the apparatus 300 or the set top box system is converted by the document creating unit 335, and the transceiver 310 transmits the converted information to the terminal.

The version comparing unit 325 compares the version of an EPG application downloaded to the terminal with that of an EPG application that can be downloaded to the terminal.

The document creating unit 335 can convert information regarding a service command processed by the command processor 340. The converted information is transmitted to the terminal via the transceiver 310. For instance, a message that the current channel is changed to a desired channel in response to the command of changing the current channel is transmitted to the terminal.

Figure 3B:
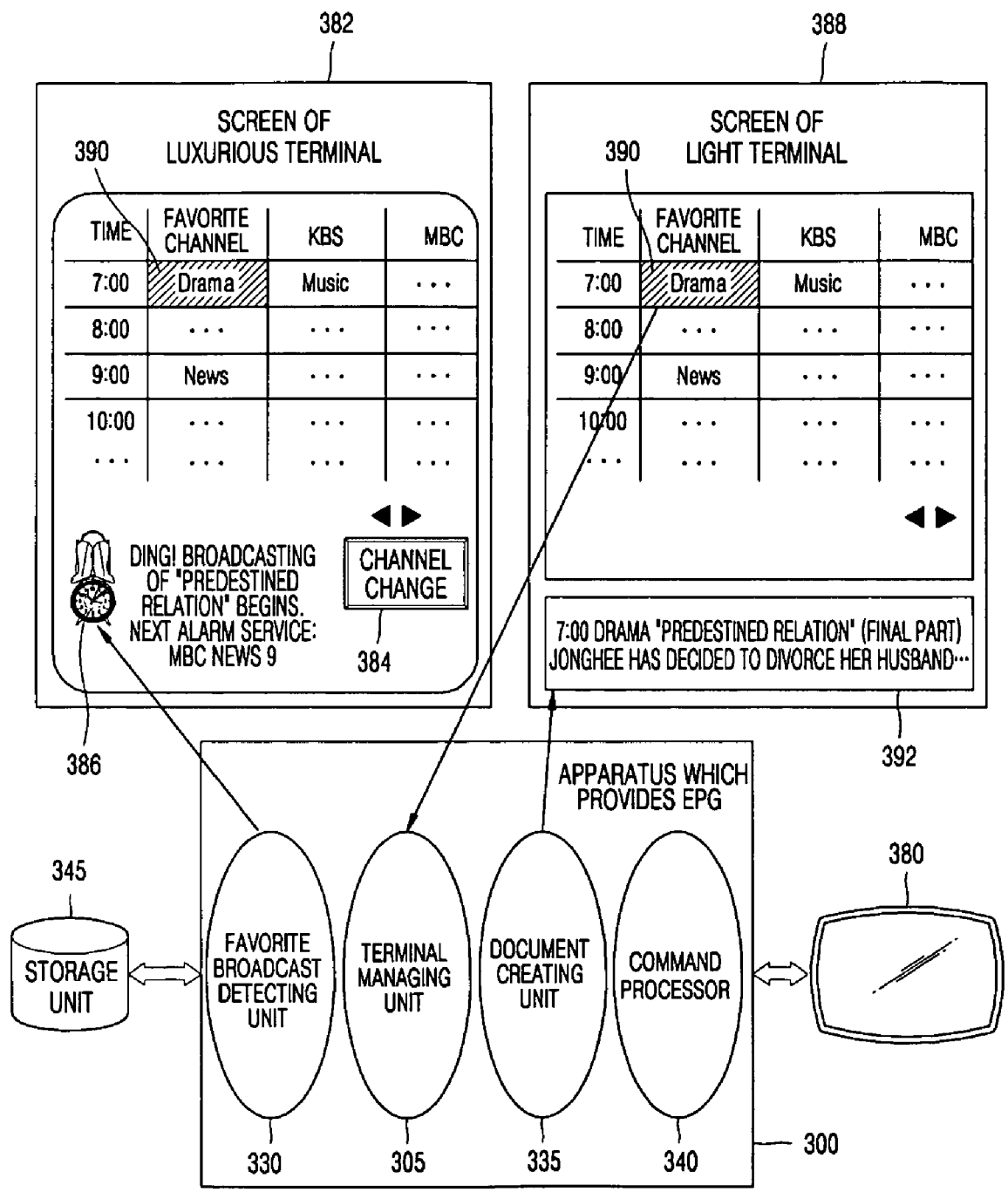
FIG. 3B illustrates EPGs displayed on a terminal by the Apparatus 300 of FIG. 3A, according to an embodiment of the present invention.

FIG. 3B illustrates EPGs displayed on a terminal by the Apparatus 300 of FIG. 3A, according to an embodiment of the present invention. Referring to FIG. 3B, the apparatus 300 is connected to a television (TV) 380.

Referring to FIG. 3B, on a screen 382 of a luxurious terminal and a screen 388 of a light terminal, broadcasts to be broadcast via respective channels are displayed horizontally in rows, and broadcasts to be broadcast according to time are displayed vertically in columns.

Also, information regarding an alarm 386 for the broadcast time of each of broadcasts to be given via a user's favorite channels according to time is displayed on the left and center of the bottom of the screen 382 of the luxurious terminal.

Synopsis 392 of each of the broadcasts to be given via the user's favorite channels according to time is displayed at the bottom of the screen 388 of the light terminal. The synopsis 392 is generated using the EPG. A broadcasting station (not shown) inserts broadcast service information into each broadcast and then transmits each broadcast, and the EPG is obtained by parsing the broadcast service information.

Further, a channel change icon 384 is displayed at the right bottom of the screen 382 of the luxurious terminal, and thus, a current channel is changed to the user's favorite channel through which a broadcast 390 is now being broadcast by clicking the channel change icon 384. In contrast, the current channel is changed to the favorite channel by clicking the broadcast 390, which is being broadcast via the favorite channel, on the screen 388 of the light terminal.

The construction of an EPG according to the present invention is not limited to the above description. For instance, the EPG may be constructed such that an icon for reserving a broadcast to be watched, an icon for reserving a broadcast to be recorded, and an icon for setting an alarm are displayed on a screen of a terminal. Also, a list of favorite broadcasts, and a list of broadcasts classified according to time and channel can be alternately displayed on the screen of the terminal by using a shift key.

When a command of changing the current channel to a favorite channel is input via the terminal, the terminal managing unit 355 transmits the command to the command processor 370. Then, the command processor 370 maps the command to a channel changing unit (not shown) of the TV 380 so that a broadcast currently being broadcast via the favorite channel can be displayed on a screen of the TV 380.

Figure 4A:
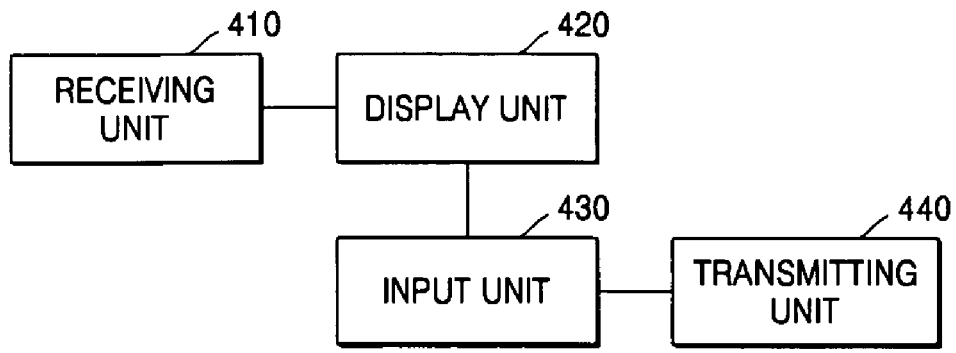
FIG. 4A is a block diagram of a terminal for displaying an EPG according to an embodiment of the present invention.
Figure 4B:
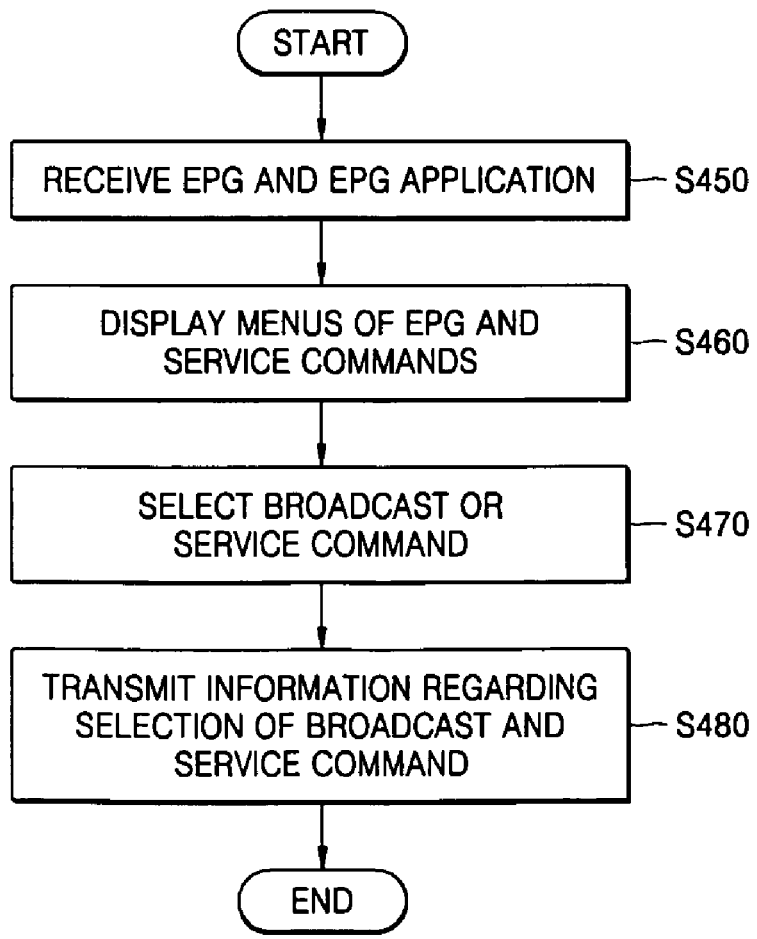
FIG. 4B is a flowchart of a method displaying an EPG according to an embodiment of the present invention.

FIG. 4A is a block diagram of a terminal which displays an EPG according to an embodiment of the present invention. FIG. 4B is a flowchart of a method of displaying an EPG according to an embodiment of the present invention. Referring to FIG. 4A, the terminal includes a receiving unit 410, a display unit 420, an input unit 430, and a transmitting unit 440.

The receiving unit 410 receives an EPG and an EPG application from an apparatus (not shown) which provides the EPG (S450). The EPG includes a list of broadcasts according to time and channel, and specifies each broadcast. The EPG further includes information regarding a user's favorite channels according to time.

The EPG application allows the broadcasts to be displayed according to time and channel, and the detailed information regarding each broadcast to be displayed. The detailed information regarding each broadcast is obtained from broadcast service information which a broadcasting station inserts into each broadcast.

The display unit 420 classifies and displays the broadcasts listed in the EPG according to time and channel, and displays a menu of service commands, using the EPG application (S460). The service commands may be a command of changing a current channel to a channel through which a displayed broadcast is being broadcast, a command of recording a broadcast, a command of reserving a broadcast to be recorded, a command of reserving a program to be watched, and a command of setting an alarm.

The construction of the EPG displayed on the display unit 420 varies according to the type of the EPG application installed in the terminal.

Next, the input unit 430 receives information regarding selection of the displayed broadcasts and information regarding selection of the displayed service commands (S470). The user can select a desired broadcast from the displayed broadcasts and a desired service command from the menu of the displayed service commands, using the input unit 430.

It is possible to input information to the input unit 430 via a touch screen, a keypad, a keyboard, a mouse, or a functional button.

Next, the transmitting unit 440 receives, from the input unit 430, the information regarding selection of the displayed broadcasts and the information regarding selection of displayed service commands, and transmits them to an apparatus which provides the EPG (S480).

As described above, according to the present invention, it is possible to provide an EPG to a user terminal by extracting broadcast service information from a digital broadcast.

An apparatus which provides an EPG according to the present invention transmits the EPG to a terminal, not a TV, and thus, a user can reserve a desired program to be watched or recorded by connecting the apparatus even outside the user's house via the terminal. Also, the apparatus is capable of providing an EPG for each user without regard to time and place, thereby reducing inconvenience caused when a plurality of users watch a TV together.

According to the present invention, a program guide is created based on a user's favorite broadcasts by analyzing the user's favorite channels, thereby preventing the user from missing a desired broadcast.

When the number of users is more than one, the inclination of favorite channels of each user is analyzed, and the favorite channels of each user are recommended according to time, based on the result of analysis. Accordingly, it is possible to provide a user with a user demand EPG service based on the user's favorite broadcasts.

Also, according to the present invention, it is possible to change a current channel to a desired channel using an EPG displayed on a terminal.

Further, the type of mobile terminal is determined according to a communication protocol used by the mobile terminal and an EPG based on the communication protocol is provided to a user. Thus, the user can obtain desired information via a desired terminal and change a current channel to a desired channel without regard to time and place.

According to the present invention, even when several TVs are installed in a house, it is possible to offer user-friendly services using information provided by an apparatus which provides an EPG.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a hard disk, a floppy disk, a flash memory, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for providing an electronic program guide, comprising:
   an information extracting unit extracting the electronic program guide, which specifies broadcasts according to time and channel, from a broadcast signal;
   a favorite broadcast detecting unit detecting a plurality of favorite channels according to time, based on statistics of broadcasts being selected by a user according to time; and
   a document creating unit converting information regarding favorite broadcasts, which are broadcast via the user's favorite channels according to time, into a document in a data format permitted in the user's terminal, the information included in the electronic program guide, the electronic program guide displaying the plurality of favorite channels according to time, wherein each favorite channel of the plurality of favorite channels is displayed on a corresponding time in a favorite channel column included in the electronic program guide, wherein the document creating unit converts information regarding an alarm indicating a broadcast time of at least one broadcast which will be broadcasted via the favorite channels of the user, into a document in the data format.

2. The apparatus of claim 1, further comprising a command processor processing a service command regarding a broadcast selected based on the converted document.

3. The apparatus of claim 1, wherein the document creating unit converts information regarding an alarm, which signals broadcast time of each favorite broadcast being broadcast via the user's favorite channels, into a document in the data format.

4. The apparatus of claim 1, further comprising a storage unit storing information regarding the selected broadcasts according to time and channel.

5. The apparatus of claim 1, further comprising a downloading unit downloading an electronic program guide application which allows the converted document to be displayed on the terminal.

6. A method of providing an electronic program guide, comprising:

extracting the electronic program guide, which specifies broadcasts according to time and channel, from a broadcast signal;

detecting a plurality of favorite channels according to time, based on statistics of broadcasts being selected by a user according to time; and converting information regarding favorite broadcasts, which are broadcast via the user's favorite channels according to time, into a document in a data format permitted in the user's terminal, the information included in the extracted electronic program guide, the extracted electronic program guide displaying the plurality of favorite channels according to time, wherein each favorite channel of the plurality of favorite channels is displayed on a corresponding time in a favorite channel column included in the electronic program guide, wherein the document creating unit converts information regarding an alarm indicating a broadcast time of at least one broadcast which will be broadcasted via the favorite channels of the user, into a document in the data format.

7. The method of claim 6, further comprising a service command regarding broadcasts selected based on the converted document.

8. The method of claim 6, wherein during converting of the information, information regarding an alarm, which signals broadcast time of each of the favorite broadcasts being broadcast via the user's favorite channels, into a document in the data format.

9. The method of claim 6, further comprising storing information regarding the selected broadcasts according to time and channel.

10. The method of claim 6, further comprising downloading an electronic program guide application, which allows the converted document to be displayed on the terminal, to the terminal.

11. A terminal comprising:

a receiving unit receiving an electronic program guide and an electronic program guide application from an apparatus which provides the electronic program guide, wherein the electronic program guide comprises information regarding a plurality of favorite channels of a user according to time and the information determined by computing statistics based on channels being selected by the user according to time;

a display unit displaying broadcasts, which are specified in the electronic program guide according to time and channel, a menu of service commands regarding the displayed broadcasts, using the electronic program guide application, and the electronic program guide including the plurality of favorite channels of the user according to time, wherein each favorite channel of the plurality of favorite channels is displayed on a corresponding time in a favorite channel column included in the electronic program guide;

an input unit receiving information regarding selection of the displayed broadcasts and information regarding selection of the displayed service commands; and a transmitting unit transmitting the received information to the apparatus, the received information is attributed to one of a plurality of users who use the electronic program guide, wherein the display unit displays information regarding an alarm indicating a broadcast time of at least one broadcast which will be broadcasted via the favorite channels of the user.

12. The terminal of claim 11, wherein the menu of service commands comprises at least one of a menu of changing a current channel to a channel through which a displayed broadcast is broadcast, a menu for recording the displayed broadcast, a menu for reserving the displayed broadcast to be recorded, a menu for reserving the displayed broadcast to be watched, and a menu for setting an alarm which signals broadcast time of the displayed broadcasts.

13. A method of displaying an electronic program guide, comprising:

receiving the electronic program guide and an electronic program guide application from an apparatus which provides the electronic program guide, wherein the electronic program guide comprises information regarding a plurality of favorite channels of a user according to time and the information determined by computing statistics based on channels being selected by the user according to time;

displaying broadcasts, which are listed in the electronic program guide according to time and channel, a menu of service commands regarding the displayed broadcasts, using the electronic program guide application, and the electronic program guide including the plurality of favorite channels of the user according to time, wherein each favorite channel of the plurality of favorite channels is displayed on a corresponding time in a favorite channel column included in the electronic program guide, and information regarding an alarm indicating a broadcast time of at least one broadcast which will be broadcasted via the favorite channels of the user;

receiving information regarding selection of the displayed broadcasts and information regarding selection of the displayed service commands; and transmitting the received information to the apparatus, the received information is attributed to one of a plurality of users who use the electronic program guide.

14. The method of claim 13, wherein the menu of service commands comprises at least one of a menu for changing a current channel to a channel through which a displayed broadcasts is broadcast, a menu for recording the displayed broadcast, a menu for reserving the displayed broadcast, and a menu for setting an alarm which signals broadcast time of the displayed broadcast.

15. The apparatus of claim 1, wherein the terminal is one of a mobile phone, a personal digital assistant, a web pad, and a remote controller.

16. The apparatus of claim 1, wherein the converted document is one of a web document and a hypertext markup language document.

17. The apparatus of claim 5, wherein the downloading unit downloads one of electronic program guide applications which are based on corresponding communication protocols, the downloaded electronic program guide application corresponding to a communication protocol used by the terminal.

18. The apparatus of claim 5, wherein the downloading unit compares a version of the downloaded electronic program guide application with a version of an available electronic program guide application, and downloads the available electronic program guide to the terminal when the version of the downloaded electronic program guide application is lower than the version of the available electronic program guide.

19. The method of claim 6, wherein the converted document is one of a web document and a hypertext markup language document.

20. The method of claim 10, wherein during downloading of the electronic program guide application, an electronic program guide application is selected from among electronic program guides, which are based on respective communication protocols, and downloaded to the terminal, the downloaded electronic program guide application corresponding to a communication protocol used by the terminal.

\* \* \* \* \*